United States Patent [19]

Bradley et al.

[11] Patent Number: 4,627,821

[45] Date of Patent: Dec. 9, 1986

[54] HELICOPTER RESCUE DEVICE

[75] Inventors: James Bradley, Delta; George E. Evans, West Vancouver; Donald Mackenzie, Delta; Michael Marcuson, Burnaby, all of Canada

[73] Assignee: Empra Systems Corp., Richmond, Canada

[21] Appl. No.: 622,270

[22] Filed: Jun. 19, 1984

[30] Foreign Application Priority Data

Sep. 2, 1983 [CA] Canada ................................. 436049

[51] Int. Cl.⁴ .......................................... B64D 47/00
[52] U.S. Cl. .................... 441/83; 244/137 P; 441/80
[58] Field of Search ............... 441/80, 83, 43; 244/137 R, 137 P; 114/348

[56] References Cited

U.S. PATENT DOCUMENTS

| 2,051,056 | 8/1936 | Nolan | 441/83 |
|---|---|---|---|
| 2,557,079 | 6/1951 | Cutri | 441/83 |
| 2,817,860 | 12/1957 | Fritz | 441/83 |
| 3,097,374 | 7/1963 | Browning | 441/43 |
| 3,176,327 | 4/1965 | Oberth | 441/83 |
| 3,421,165 | 1/1969 | Pugh | 441/83 |
| 4,124,181 | 11/1978 | Kolwey | 244/137 P |
| 4,138,077 | 2/1979 | Okumura | 244/137 P |

FOREIGN PATENT DOCUMENTS

| 179455 | 9/1917 | Canada . | |
|---|---|---|---|
| 718673 | 9/1965 | Canada . | |
| 3870 | of 1891 | United Kingdom | 441/80 |
| 476017 | 3/1937 | United Kingdom . | |
| 576426 | 4/1946 | United Kingdom . | |
| 1214036 | 11/1970 | United Kingdom . | |
| 1241609 | 8/1971 | United Kingdom . | |
| 232782 | 12/1968 | U.S.S.R. | 441/80 |

Primary Examiner—Trygve M. Blix
Assistant Examiner—Edwin L. Swinehart
Attorney, Agent, or Firm—Burns, Doane, Swecker & Mathis

[57] ABSTRACT

A rescue device for use with a helicopter comprises a floatation ring large enough to surround several standing persons and a rigid, non-buoyant open decking capable of supporting those persons. A collapsable netting surrounds the deck and connects the floatation ring thereto. The floatation ring has sufficient buoyancy to support the whole device when in the water with the deck suspended below the water level and with several persons standing on the deck and who are partially submerged. Supporting cables for use with a helicopter hoist are fixed both to the ring and to the deck so that when the device is lifted the ring is held a predetermined distance above the deck.

4 Claims, 3 Drawing Figures

HELICOPTER RESCUE DEVICE

FIELD OF THE INVENTION

The present invention relates to a device intended to be lifted by a helicopter and capable of rescuing persons from open water. The device can also serve to support such persons in the water while awaiting rescue.

PRIOR ART

Presently, there are available harness devices and nets for use with helicopters for lifting survivors from open water and winching them into a helicopter. Harness devices are only capable of lifting one person at a time and require the person to be conscious and able to put on the harness. Net devices have also been used for pulling survivors from water and have usually been of the so-called side entry type. However, the existing side entry net devices are extremely difficult to enter. The net folds in the water and the survivor has to find the opening and disentangle it before entering.

A net device is also proposed in accordance with U.S. Pat. No. 2,817,860 which issued to Fritz on Dec. 31, 1957. This patent shows a net device having an open top with a floatation ring so that the main part of the net is suspended under water. It appears that this device is intended to rescue only one person at a time since during rescue the net is partially collapsed and the netting bottom provides a kind of sling for the survivor.

SUMMARY OF THE INVENTION

The present invention provides a device which can rescue several persons at one time, for example 6 to 15 persons depending on the size of helicopter for which it is designed. The device is easy to enter, and once a person has entered it he is relatively safe even if the device is not immediately lifted by a helicopter.

The device in accordance with the invention comprises a floatation ring which is large enough to surround several standing persons, a rigid, non-buoyant open decking suitable for supporting the feet of such persons while they are in the water and while they are being rescued, and collapsable netting connecting the ring and the deck and fully surrounding the deck area. The floatation ring has sufficient buoyancy to support the whole device while in the water with the deck suspended below the water level. The distance between the floatation ring and the deck is preferably about 4 feet or about 1.2 meters, so that a person standing on the deck has the ring at chest height and is supported mainly by the water and does not much affect the buoyancy of the device.

The device further includes cable means for suspending the device from a helicopter, the cables being arranged to allow easy entry of the device over the floatation ring, and the cable means being fixed to the deck and fixed or limited in movement relative to the ring so that when the device is lifted by the cable means the major lifting forces are transmitted to the deck while the ring is held a predetermined distance above the deck.

BRIEF DESCRIPTION OF THE DRAWINGS

The device will be further described with reference to the accompanying drawings which show a preferred embodiment, and in which.

Figure 1:
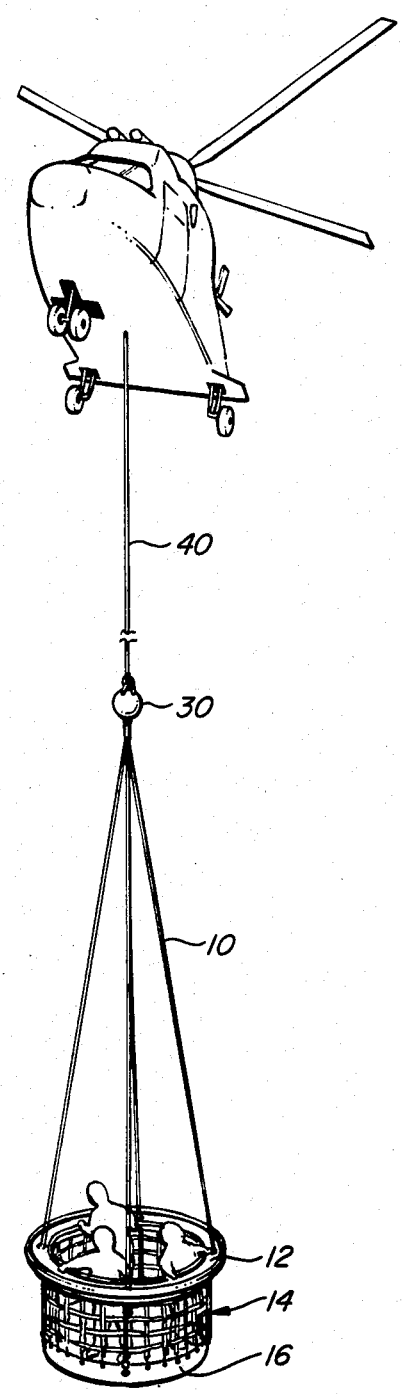
FIG. 1 is a perspective view of the device being carried by a helicopter.
Figure 2:
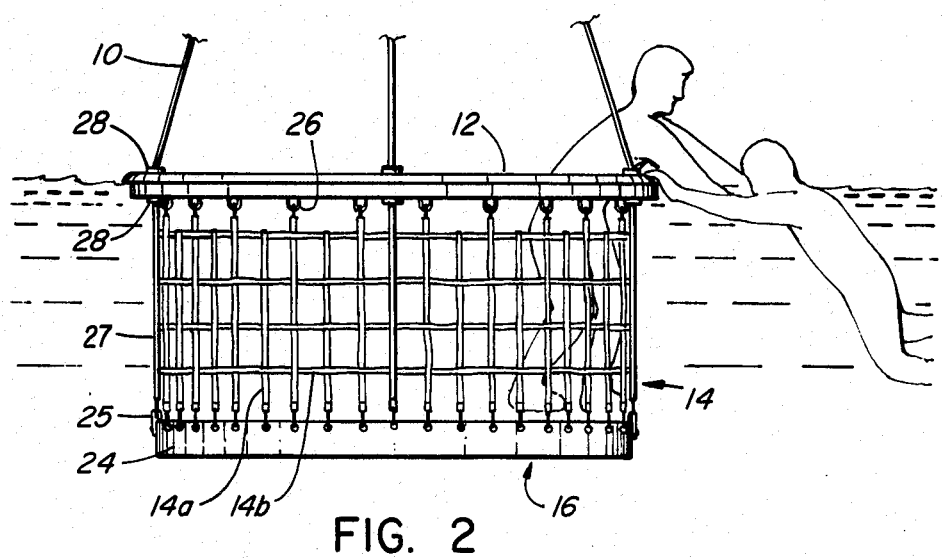
FIG. 2 is a side elevation of the device floating in the water in the condition in which survivors can enter the device.
Figure 3:
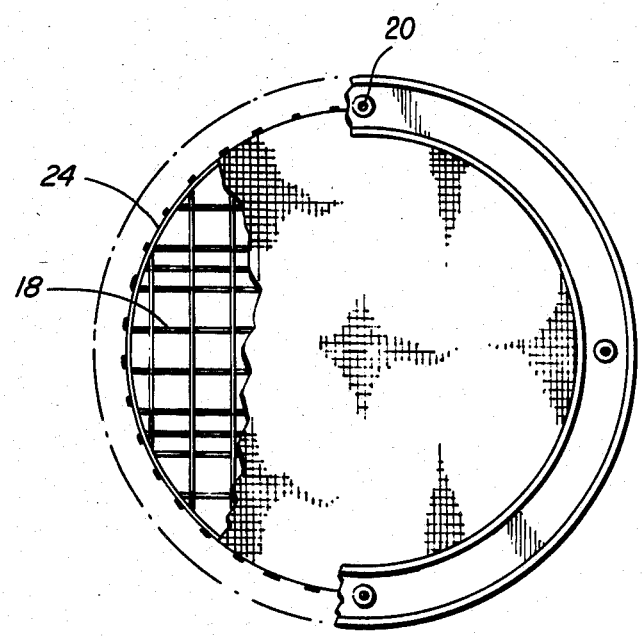
FIG. 3 is a plan view of the device.

The device as shown in FIG. 1 is being lifted by the helicopter by means of upper cables 10. The device comprises an upper, floatation ring 12 which has an internal diameter large enough to accommodate several persons and may for example have an internal diameter between about 3½ and 7½ feet (or between about 1.5 and 2.5 meters). The ring includes a metal casing and a filling of styrofoam or other light weight material so that it can support the weight of the whole device including the cables 10, in water.

The ring 12 is connected by means of netting sides 14 to a rigid metal deck 16 which has a open frame work 18. The deck is formed of flat metal bars which are set on edge to form a grid pattern, the bars being slotted where they cross over so that they fit together to form a rigid egg crate type frame work. A wire mesh having square 1 inch (2.5 cm) apertures covers the whole deck. The decking is surrounded by a cylindrical metal band 24, which has apertures for receiving shackles 25 connected to the lower ends of vertical netting members 14a, the upper ends of which are attached to U-bolts 26 fixed to the underside of the top ring 12. The netting also includes circular, horizontal portions 14b which surround the space between the top ring 12 and the deck 16, so that this space is totally enclosed and a survivor cannot fall out of the device between the top ring 12 and the deck.

Also connecting the top ring and the deck are lower cables 27 which are 4 in number and equally spaced around the device. The lower ends of lower cables 27 are securely shackled to the deck, and the upper ends of these cables are connected to rigid links 28 which pass through vertical bores 20 in the ring 12 have their upper ends connected to upper cables 10 so that upper and lower cables 10 and 27 together form cable means fixed to the deck and capable of supporting the device. These links are fixed against sliding within the bores 20.

The upper ends of the cables 10 are connected together and the junction is attached to a buoy 30 which is in turn attached to a helicopter hooking ring. This hooking ring engages with a hook at the lower end of the helicopter cable 40. The buoy has a light beacon and it is radar reflective for easy location in the water. Further, the whole device can be painted with reflective paint to aid location by day, and can be provided with lights for easier location at night.

In use under normal conditions, the device will be lowered from a helicopter into the water near survivors, the helicopter being lowered until the cables become slack and the device is floating with its floatation ring 14 having its upper surface near the water surface. The deck 16, being made of metal and therefore non-buoyant, will be suspended below the water surface. The fact that the deck construction is heavy compared to the rest of the device means that the centre of gravity is low and the device is stable in the water. Since the cables 10 are well spaced apart there is adequate space for survivors to enter the device by rolling or crawling across the floatation ring 12. This is much easier for a survivor than it is to climb into a standard life raft. The survivors can stand in the device with their feet on the solid decking, holding onto the floatation ring, without greatly changing the buoyancy of the device. Since the device is buoyant the cables can be slackened to allow the device to ride the waves rather than the helicopter having to continually adjust its height. Also, the helicopter crew has the option of detaching the helicopter line 40 from the device if conditions are not suitable for rescue, or if too many persons have entered the device, and the device can be retrieved later. The device has high hydrodynamic drag due to the deck construction, but very little windage, so the device will not be blown away if released in the water.

When a suitable number of survivors, up to say 20, have entered the device, it will be lifted out of the water. The major lifting forces are transmitted by upper cables 10 and lower cables 27 to the rigid deck so that there is little stress placed on the floatation ring, although the ring remains at a constant height above the deck while the cables are taught. The device can be set down on a suitable surface such as the deck of a ship, and the netting sides and cables 27 will then collapse allowing the survivors to step out of the device easily.

We claim:

1. A device which provides buoyant support for persons in water and is suitable for lifting by a helicopter comprising a buoyant floatation ring large enough to surround several standing persons, a rigid, non-buoyant substantially flat apertured deck for supporting said persons when standing on the deck, collapsible netting connecting said ring and said deck and fully surrounding the deck area, the floatation ring having sufficient buoyancy to support the whole device and deck in the water with the deck suspended below water level, and supporting cable means for suspending said device with several persons therein from a helicopter, said cable means allowing easy entry over the top of said ring and being connected to the deck and limited in movement relative to the ring so that when the device is suspended by the cable means, the major lifting forces are transmitted to the deck while the ring is held well spaced above the deck, and wherein said deck comprises a series of flat metal bars set on edge and forming a grid pattern.

2. A device according to claim 1 wherein the cable and netting arrangement is such that the deck is normally suspended at such distance below the ring that for an adult standing on the deck the ring is at chest height, and wherein this spacing is substantially retained when the device is lifted by the cables.

3. A rescue device according to claim 1 including a buoy connected to said cables adjacent the upper ends thereof.

4. A rescue device according to claim 1 wherein said bars of said deck are surrounded by a cylindrical metal band.

* * * * *